United States Patent [19]

Gralka

[11] Patent Number: 4,844,480
[45] Date of Patent: Jul. 4, 1989

[54] PRESSURE SENSITIVE SHAFT SEALING RING

[75] Inventor: Bernhard Gralka, Bensberg, Fed. Rep. of Germany

[73] Assignee: Ford Motor Company, Dearborn, Mich.

[21] Appl. No.: 247,226

[22] Filed: Sep. 21, 1988

[30] Foreign Application Priority Data

Dec. 4, 1987 [DE] Fed. Rep. of Germany ....... 3741084

[51] Int. Cl.⁴ .............................................. F16J 15/44
[52] U.S. Cl. ..................................... 277/70; 277/134; 277/153
[58] Field of Search ................. 277/134, 152, 153, 27, 277/26, 165, 173-177, 134, 21, 22, 83, 28, 27, DIG. 2, 70, 71

[56] References Cited

U.S. PATENT DOCUMENTS

| | | | |
|---|---|---|---|
| 2,743,950 | 5/1956 | Helfrect | 277/179 |
| 3,472,519 | 10/1969 | Gehret | 277/75 X |
| 3,606,352 | 9/1971 | Lutz | 277/153 X |
| 3,685,838 | 8/1972 | Malmstrom | 277/75 X |
| 3,785,660 | 11/1974 | Bush | 277/134 |
| 4,433,846 | 2/1984 | Romero et al. | 277/29 X |
| 4,522,411 | 6/1985 | Burgan | 277/134 |
| 4,613,143 | 9/1986 | Butler | 277/134 |
| 4,616,836 | 10/1986 | Drygalski et al. | 277/134 X |

FOREIGN PATENT DOCUMENTS 3236636 5/1986 Fed. Rep. of Germany .

*Primary Examiner*—William A. Cuchlinski, Jr.
*Assistant Examiner*—Jeffrey Hohenshell
*Attorney, Agent, or Firm*—Frank G. McKenzie; Donald J. Harrington

[57] ABSTRACT

A radial shaft sealing ring includes an outer fastening ring reinforced by an insert for fixing the sealing ring in the bore of a casing through which a rotating shaft passes. The sealing ring includes a sealing lip directed toward the inside of the casing and biased by a spring against the outer surface of the shaft. A dust protection lip, directed angularly toward the outside of the casing, includes an arcuate cut through its thickness defining a deflectable tab, which opens by bending through the thickness of the lip within the space extending between the dust protecting lip and the sealing lip when pressure within the space rises.

8 Claims, 1 Drawing Sheet

PRESSURE SENSITIVE SHAFT SEALING RING

BACKGROUND OF THE INVENTION

1. Field of the Invention

This invention relates to shaft seals for preventing passage of contaminants. More particularly, the invention pertains to a seal that prevents the occurrence of underpressure otherwise tending to cause excessive wear of a sealing surface.

2. Description of the Prior Art

A radial shaft sealing ring having a dust protection lip is described in German Pat. No. 32 36 636. The sealing ring described in this patent connects the interior of a casing to a space bounded by two sealing lips and a shaft extending through an opening into a casing. A pressure-sensitive diaphragm opens whenever an overpressure is formed in the interior of the casing. The diaphragm opens toward the space between the sealing lips and shaft so that oil, in liquid or vapor form, within the casing passes through the open diaphragm onto the shaft.

The shaft sealing ring can be fitted only above the normal level of the lubricating oil within the casing; otherwise, it would leak continually. However, even if the sealing ring is located above the level of lubricating oil, oil spray within the gearbox casing enters the space between the sealing lips. Oil located within this space eventually wets the outer dust protection lip, whose purpose is to prevent entry of dust from outside the casing. A dust protection lip wetted with lubricating oil retains dust on the wetted surface, which abrades the shaft surface tending to remove the seal contrary to its intended purpose. A dry dust protection lip continually repels exterior dust.

SUMMARY OF THE INVENTION

Due to high rotational shaft speed, approximately 3m/sec, and the presence of an inner sealing lip biased by a spring into contact with the shaft, an underpressure develops in the space between the sealling lips and the shaft. Underpressure in this space causes the dust protection lip to be drawn with greater force against the rotating shaft and increases wear of the sealing lip. Over a period of time, the lip surface contacting the shaft erodes and defeats the sealing function sooner that otherwise would occur if underpressure were absent. To avoid this operating difficulty, a dust protection lip is not used in a shaft sealing ring under service conditions where rotational speed of the shaft is high. However, elimination of the dust protection lip from shaft sealing rings, particularly when used to seal a motor vehicle transmission casing, eliminates the considerable protective effect of the lip that is preferred in that application. Consequently, in those instances when the dust protection lip is eliminated from the shaft sealing ring, other means, such as slinger rings or labyrinth seals, located on the outer side of the seal assembly is used to prevent ingress of dirt and dust.

An object of this invention is to provide a radial shaft sealing ring having an outer dust protection lip and an inner radial sealing lip that operates to prevent occurrence of undesired underpressure in the space bounded by the lips and a rotating shaft. The space between the two sealing lips is connected to atmosphere by one or more tabs formed by cutting an arcuate slit through the thickness of the dust protection lip. The tab moves by bending through the thickness of the lip between a closed position and an open position in accordance with the magnitude of the differential pressure across the dust protection lip. When the underpressure rises, tabs open communication between the space and atmosphere external to the gearbox casing. The tabs are distributed angularly about the axis of the shaft and permit continuous sealing contact between the dust protection lip and the exterior surface of the shaft while permitting opening and closing of the space to atmosphere.

The tabs deflect inwardly into the space when opened, thereby wiping away on the outer side of the seal any dust adhering to the outer surface of the dust protection lip. This prevents entry of dust into the space between the sealing lip. The arcuate slits cut through the lip thickness that form the tab to eliminate underpressure are small; therefore, the dust protection lip reliably prevents its being drawn onto the shaft by maintaining substantially no pressure differential across the dust protection lip.

BRIEF DESCRIPTION OF THE DRAWINGS

This invention is explained in greater detail with reference to an embodiment illustrated in the drawing.

DESCRIPTION OF THE PREFERRED EMBODIMENT

Figure 1:
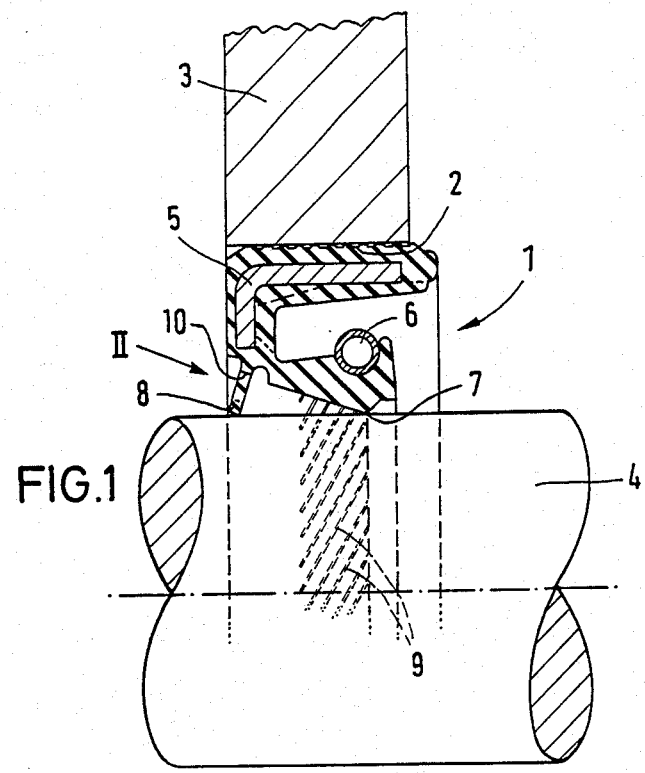
FIG. 1 is a partial cross section through a shaft sealing ring having a dust protection lip according to the invention.

A radial shaft sealing ring 1, located in a space between the bore 2 of a casing 3 and a shaft 4, seals the space against passage of contaminants. The sealing ring includes a reinforced fastening ring 5, a radial sealing lip 7 directed toward the interior of the casing forced by a spring ring 6 against the shaft, and a dust protection lip 8 directed toward the exterior of the casing and the shaft.

Figures 2, 3:
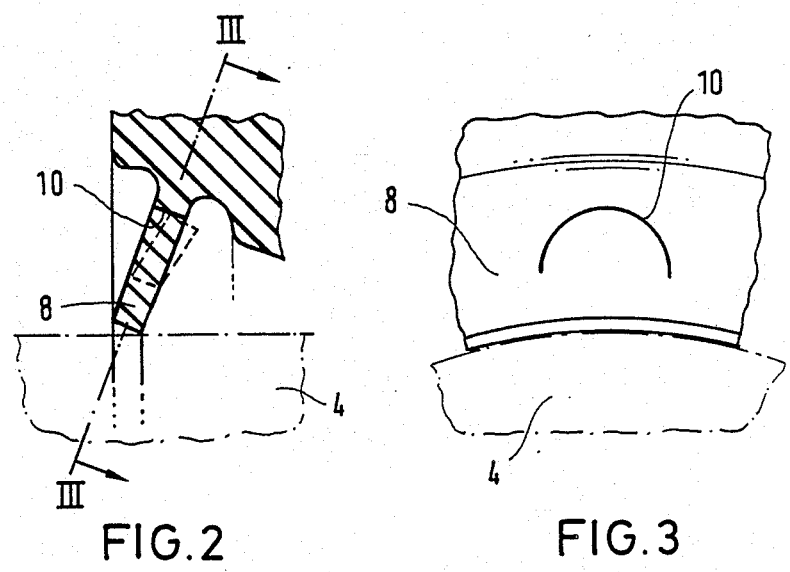
FIG. 2 is an enlarged view taken in the direction of arrow II in FIG. 1 showing the region of the dust protection loop and a pressure-senstive diaphragm opening.
FIG. 3 is a view along the plane III—III in FIG. 2.

Swirl webs 9 formed on the outer surface of the shaft operate when the shaft is rotating at high speed to pump air from the space bounded by the outer surface of the shaft, lip 7 and protection lip 8 to produce an underpressure in this space. Underpressure causes dust protection lip 8 to deflect, as shown in FIG. 2, and the resiliently suspended sealing lip 7 to be drawn more firmly against the outer surface of the shaft. When lip 7 is forced in this way against the shaft, the ceiling lip is susceptible to wear to an extent greater than intended. This wear causes permanent loss of the desired sealing effect. According to this invention, lip 8 includes one or more pressure-sensitive diaphragm openings resulting from an arcuate cut 10 through the thickness of lip 8, several of which may be spaced angularly about the axis of the shaft. The cut through the lip forms a tab that moves by bending through the thickness of the lip when underpressure in the space between lips 7 and 8 is present in comparison to pressure outside the casing.

The circular extent of arcuate cuts 10 in dust protection lip 8 is determined empirically so that underpressure occurring in the space between sealing lips 7 and 8 is rapidly reduced but the deflectable tab formed by the cut in the dust protection lip 8 is not deflected or opened by exposure to mud or dirt outside the space.

Because the pressure-sensitive tab opening is formed only by cut 10, which defines a minimum slot for compensating the pressure difference when underpressure occurs, entry of dirt into the space between the sealing lips cannot occur when the tab opens.

Having described a preferred embodiment of my invention, what I claim and desire to secure by U.S. Letters Patent is:

1. A shaft seal for preventing entry of contaminants past a partition defining interior and exterior spaces and having an opening through which a shaft passes, comprising:
    a fastening ring adapted for fitting on the periphery of the opening through the partition;
    an inner sealing lip depending from the fastening ring, inclined angularly therefrom toward the inside of the partition;
    spring means for urging the inner sealing lip into contact with the shaft; and
    an outer sealing lip depending from the fastening ring, inclined angularly therefrom toward the exterior of the partition, and having a opening through the thickness of the outer sealing lip defining a tab that moves in accordance with differential pressure across the outer sealing lip to open and close communication through the opening.

2. The seal of claim 1 wherein the opening in the outer sealing lip is formed by a slit through the thickness of said outer sealing lip and the tab comprises material disconnected by the slit from, and resiliently hinged to, the outer sealing lip.

3. A shaft seal for preventing entry of contaminants past a partition defining interior and exterior spaces and having an opening through which a shaft passes, comprising:
    an inner sealing lip defining a surface contacting the shaft located near the inside of the partition and;
    an outer sealing lip having a surface contacting the shaft located near the exterior of the partition, and an opening through the thickness of the outer sealing lip defining a tab that moves in accordance with differential pressure across the outer sealing lip to open and close communication through the opening.

4. The seal of claim 3 wherein the opening in the outer sealing lip is formed by a slit through the thickness of said outer sealing lip and the tab comprises material disconnected by the slit from, and resiliently hinged to, the outer sealing lip.

5. A shaft seal for preventing entry of contaminants past a partition defining interior and exterior spaces and having an opening through which a shaft passes, comprising:
    an inner sealing lip defining a surface contacting the shaft located near the inside of the partition; and
    an outer sealing lip having a surface contacting the shaft located near the exterior of the partition, an opening through the thickness of the outer sealing lip defining a tab resiliently biased to close communication through the opening and to open said communication in accordance with differential pressure across the outer sealing lip.

6. The seal of claim 5 wherein the opening in the outer sealing lip is formed by a slit through the thickness of said outer sealing lip and the tab comprises material disconnected by the slit from, and resiliently hinged to, the outer sealing lip.

7. A shaft seal for preventing entry of contaminants past a partition defining interior and exterior spaces and having an opening through which a shaft passes, comprising:
    an inner sealing lip defining a surface contacting the shaft located near the inside of the partition; and
    an outer sealing lip having a surface contacting the shaft located near the exterior of the partition, an opening through the thickness of the outer sealing lip defining a space between the inner sealing lip, outer sealing lip and the shaft and a tab resiliently biased to close communication through the opening and tending to open said communication when pressure outside the partition exceeds pressure within the space.

8. The seal of claim 1 wherein the opening in the outer sealing lip is formed by a slit through the thickness of said outer sealing lip and the tab comprises material disconnected by the slit from, and resiliently hinged to, the outer sealing lip.

* * * * *